United States Patent [19]
Kennedy et al.

[11] Patent Number: 5,148,452
[45] Date of Patent: Sep. 15, 1992

[54] GLOBAL POSITIONING SYSTEM DIGITAL RECEIVER

[75] Inventors: Howard L. Kennedy, Phoenix; Thomas M. King, Tempe, both of Ariz.

[73] Assignee: Motorola, Inc., Schaumburg, Ill.

[21] Appl. No.: 636,168

[22] Filed: Dec. 31, 1990

[51] Int. Cl.$^5$ .................... H03D 3/02; H04L 27/06
[52] U.S. Cl. .......................... 375/96; 375/1; 375/97; 364/728.03; 455/207; 455/209; 455/260; 342/352; 342/357
[58] Field of Search ............ 375/1, 75, 79, 81–84, 375/96, 97; 329/306, 307, 310; 455/131, 205, 207–209, 260; 342/378, 108, 352, 357; 364/728.03

[56] References Cited

U.S. PATENT DOCUMENTS

| | | | |
|---|---|---|---|
| 4,112,497 | 9/1978 | Layland et al. | 375/96 |
| 4,426,712 | 1/1984 | Gorski-Popied | 375/96 |
| 4,569,061 | 2/1986 | Breitwisch | 375/96 |
| 4,754,465 | 6/1988 | Trimble | 375/120 |
| 4,769,816 | 9/1988 | Hochstadt et al. | 375/96 |
| 4,785,463 | 11/1988 | Janc et al. | 375/1 |
| 4,847,862 | 7/1989 | Braisted et al. | 375/120 |
| 4,860,321 | 8/1989 | Von der Embse | 375/96 |

Primary Examiner—Benedict V. Safourek
Assistant Examiner—Young Tse
Attorney, Agent, or Firm—Frank J. Bogacz

[57] ABSTRACT

A digital GPS (Global Positioning System) receiver for receiving a plurality of coded satellite signals. The plurality of satellite signals are transmitted by a corresponding plurality of satellites. Since these satellites are moving rapidly with respect to the receiver, Doppler shifting of the signals is exhibited. The signals are converted from analog to digital at intermediate frequency levels. The signals are then separated simultaneously into a plurality of digital signals corresponding to I and Q channel information for each transmitting satellite. A processor then converts these I and Q channel information signals to pseudo-range and broadcast data for navigation and time purposes.

29 Claims, 4 Drawing Sheets

GLOBAL POSITIONING SYSTEM DIGITAL RECEIVER

BACKGROUND OF THE INVENTION

The present invention pertains to radio signal receivers and more particular a global positioning system (GPS) digital receiver.

The global positioning system is a constellation of satellites which transmits navigation information via radio signals. Time and position may be calculated by receivers which are able to receive and process these radio signals. The satellites of the GPS constellation broadcast two BPSK modulated signals at L-band, 1575.42 megahertz (L1) and 1227.6 megahertz (L2). The modulated signals include psuedorandom noise codes and data. The L1 signal carrier is modulated in quadrature with both a clear acquisition code (CA code) and a precise code (P code). The chipping rate of the CA code is 1.023 megahertz and the P code is 10.23 megahertz. The L2 frequency is modulated with only one code, normally the P code.

It is necessary to track at least four satellites of the GPS constellation in order to compute a GPS receiver's position in three dimensions and determine time. One method of tracking at least four satellites, is to assign one receiver channel to track each of the satellites. This is termed continuous tracking. Another method of tracking four satellites with fewer than four channels requires time-sharing of the channels among the four or more satellite signals. This type of tracking is referred to as sequencing.

Data loss may result from the time required to lockup or synchronize to a particular satellite signal during the sequencing process. Accordingly, such operation requires circuitry which may be set up rapidly by the control circuitry when the time-sharing operation causes switching from one satellite to another. In addition for digital receivers, high Doppler frequencies require high-speed logic to rapidly process the digitized signals.

A receiver whose architecture and design is flexible to the extent of being able to expand the number of channels with a minimum of additional components and operate in either the continuous or sequencing modes will apply to the largest number of applications resulting in the lowest cost. The prior art GPS receivers do not provide this flexibility and hence low-cost features. Another short coming of the prior art is the inability to provide a low-cost integrated circuit chip set, including oscillator, which embodies the circuitry of requisite speed to handle a number of channels for sequencing or continuous tracking mode operations. Typically such circuitry requires several integrated circuits and discrete components which in some implementations must be matched for signal delay and phase shift.

Accordingly, it is an object of the present invention to provide a multi-channel GPS digital receiver which operates in the continuous or sequencing modes at higher user velocities while maintaining circuitry simplicity, accuracy, and is low in cost.

SUMMARY OF THE INVENTION

According to the present invention a novel GPS receiver employing digital techniques is shown.

A digital GPS receiver receives a plurality of coded satellite signals from a corresponding plurality of satellites. These coded satellite signals exhibit Doppler shifting as a result of the movement of the satellites with respect to the receiver. The digital GPS receiver includes a conversion of the coded satellite signals to intermediate frequency signals.

Next, the intermediate frequency signals are converted from analog to digital by a converter which simultaneously translates the plurality of intermediate frequency signals to a corresponding plurality of digital signals. An analog-to-digital converter is coupled to the correlator-decimator. The correlator simultaneously separates each of the plurality of digital signals into I and Q channel information signals. The processor which is coupled to the correlator then retrieves pseudo-range and broadcast information transmitted by each of the satellites in response to the I and Q channel information signals.

The above and other objects, features, and advantages of the present invention will be better understood from the following detailed description taken in conjunction with the accompanying drawings.

DESCRIPTION OF THE PREFERRED EMBODIMENT

Figure 1:
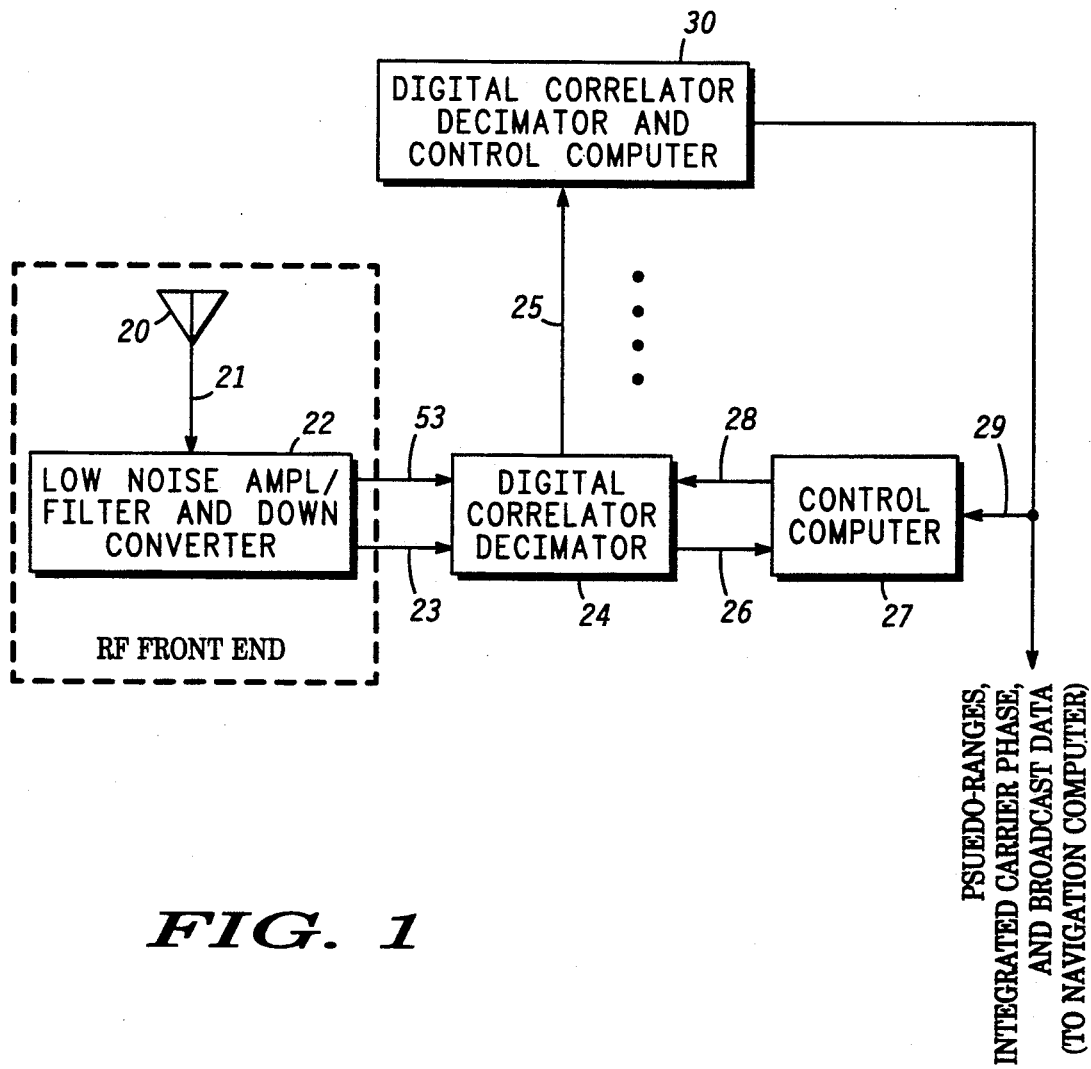
FIG. 1 is an overall block diagram of a GPS receiver in accordance with the principles of the present invention.
Figure 2:
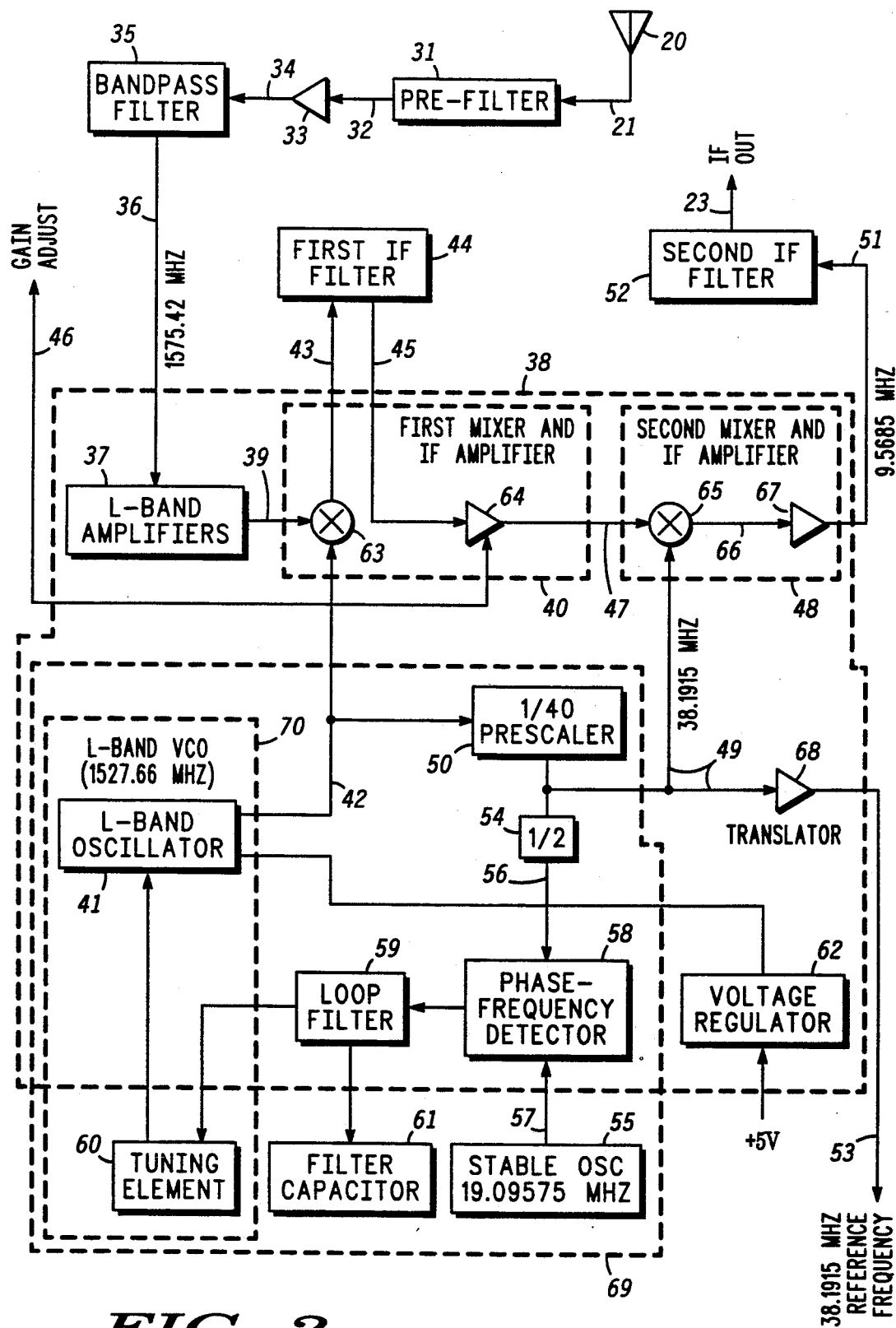
FIG. 2 is a detailed block diagram of the GPS receiver of FIG. 1.

FIG. 1 illustrates the primary functional blocks of the GPS receiver as implemented in accordance with the invention. This FIG. is shown to employ an antenna 20 that is suitable of receiving the L-band (L1) signals broadcast by the GPS satellites. The present embodiment uses a microstrip "patch" having essentially hemispherical coverage and right hand circular polarization. The antenna output terminals 21 are connected to a down converter 22. Details of the preferred embodiment of down converter 22 are shown in FIG. 2. The output of down converter 22 is an intermediate frequency signal 23 containing the frequency translated satellite signals.

Figure 3:
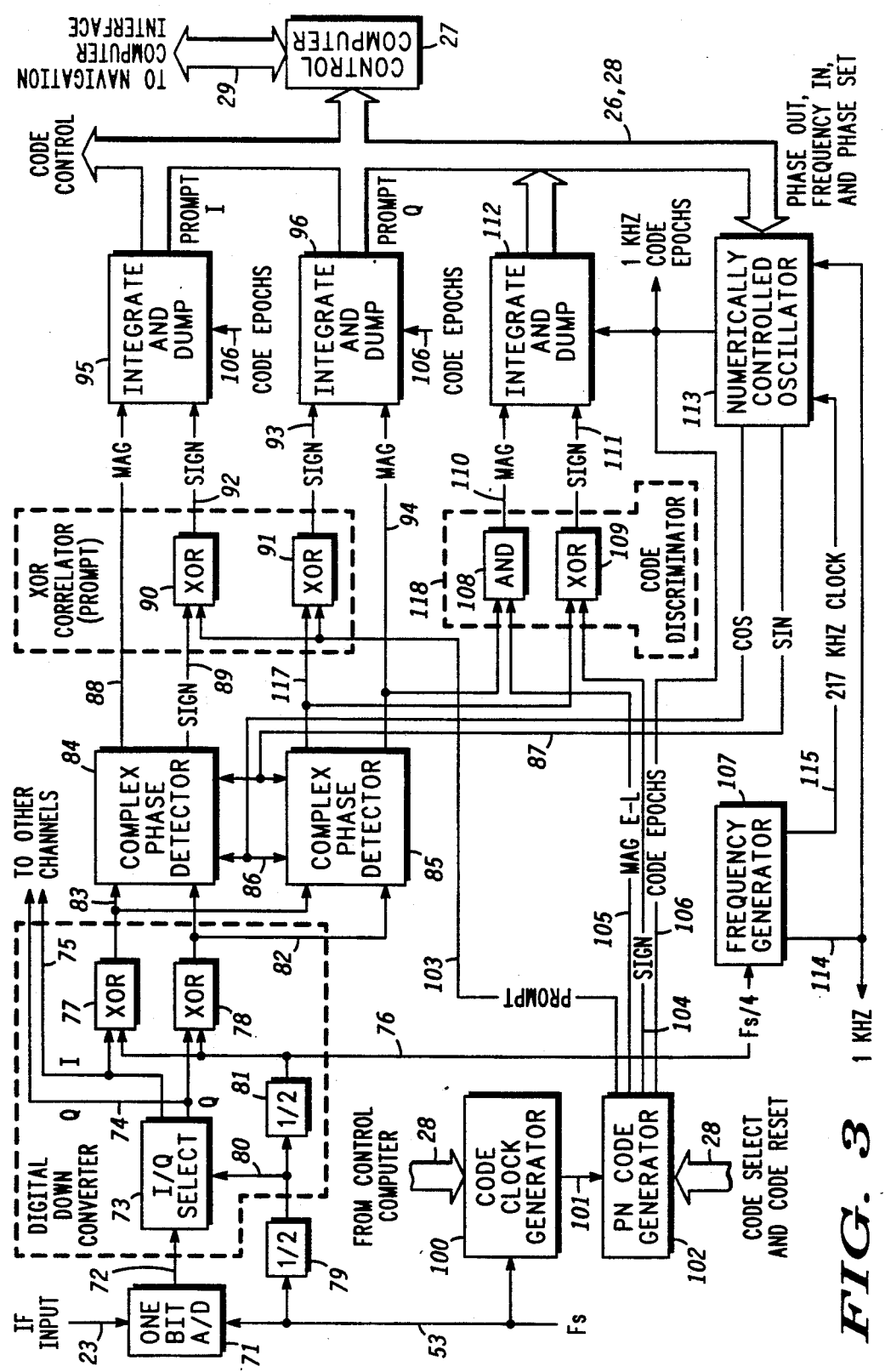
FIG. 3 is a block diagram of a single satellite signal channel of the digital correlator.

Output 23 is connected to a digital correlator decimator 24. The correlator decimator has two output types, a high-speed outputs 25 and decimated outputs 26. The high-speed output 25 provides two signals, they are the uncorrelated digitized in-phase "I" and quadrature "Q" signals. The signals 25 are connected to block 30 which optionally contains an additional number of channels that may operate in parallel with each other. The ability to expand the number of channels allows the use of the same digital circuit blocks to be used for both simple one channel sequencing and multiple parallel channel receivers. Block 30 may be replicated to track more than two satellites. Each replication of block 30 will increase the number of channels by two. So for a four channel system two replications of block 30 are required. A single A/D converter is employed. Additional correlators and computers, block 30, may be easily added and simultaneously driven from this single A/D converter. Typically the simple receiver would have two channels that are time shared among four or more satellites. The multiple parallel channel receivers are used to track four or more satellites simultaneously and are required by the more sophisticated applications such as geodetic survey. The high-speed signals 25 are output from an analog to digital (A/D) converter of correlator 24, details are shown in FIG. 3. All of the uncorrelated satellite signals are present at output 23, therefore they all sampled simultaneously, freeing the receiver from inter-channel biases and the need to duplicate the A/D circuits for each channel.

The decimated outputs on buss 26 include the correlated filtered outputs of the digital signal processing circuits. The filtered signals 26 have a nominal output rate of one kilohertz, a rate sufficiently slow to be further processed by control computer 27.

The control computer 27 further processes signals 26 to derive the necessary control signals 28 and calculate the pseudo-range and integrated carrier phase measurements. The broadcast satellite data is also recovered in the process. Both are output on buss 29. Because of the slow output rate, the control computer can be a low cost microprocessor such as the MC68HC11 with related memory. Computer 27 outputs control signals 28 to block 24. Control computer 27 also has and additional input/output buss 29 which transfers the receiver measured data to the navigation computer (not shown). Use of a more sophisticated microprocessor, such as the MC68331, would allow use of a single computer to preform both the control and navigation functions for a number of channels.

FIG. 2 shows the antenna output terminals connected to a pre-filter 31. In the present implementation, the filter is a band pass filter that provides out of band rejection to signals received by the antenna. In the present implementation, this filter is miniaturized and has a nominal band width of 50 MHZ. The filter output terminals 32 are connected to a low noise amplifier 33. In the preferred implementation, amplifier 33 is a monolithic microwave integrated circuit (MMIC) having a minimum gain of 22 DB and has its output 34 connected to a second miniaturized filter 35 that provides additional rejection of out of band signals and rejects signals at the first image frequency. In the present embodiment, the Image (bandpass) filter 35 has an output 36 which is connected to 38, an RF integrated circuit (RFIC). L-band input 36 is connected to amplifiers 37. In the present embodiment, this amplifier provides a nominal 23 DB of gain to the received satellite signals. Amplifier output 39 is connected to block 40 containing a first mixer 63 and intermediate frequency (IF) amplifier 64 which together provide up to an additional 32 DB of gain. The first local oscillator (LO) injection frequency is provided on lead 42 to first mixer 63 by L-band voltage controlled oscillator (VCO) 70. The mixer output 43 is connected to a first IF filter 44. First IF filter 44 has an output 45 which is connected to the first IF amplifier 64. The gain of amplifier 64 may be adjusted via lead 46 via the GAIN ADJ. lead. First IF amplifier 64 operates at a nominal frequency of 47.76 MHZ with output 47 connected to block 48 which contains the second mixer 65 and the second IF amplifier 67. The second LO injection frequency is supplied to second' mixer 65 by Prescaler 50 via lead 49. In the present embodiment of the invention, this second LO frequency is a nominal 38.1915 MHZ. The frequency of the signal on output 66 of second mixer 65 will be the difference between the signal frequencies on leads 47 and 49. The signal on lead 66 is amplified by second IF amplifier 67 and then connected to a second IF filter 52 via lead 51. Filter 52 is an antialiasing filter which further rejects out of band signals prior to being digitized by block 24, the digital correlator decimator FIG. 1. Note that the nominal output frequency of second IF amplifier 67 is approximately one forth of the sampling frequency appearing on lead 53, providing an simple means of obtaining the "I" and "Q" signals as explained in the detailed discussion of FIG. 3.

All of the LO injection frequencies are derived from the L-band voltage controlled oscillator (VCO) 70. The signal on lead 42 is the output of oscillator 41. The frequency of output 42 is divided by prescaler 50. Prescaler 50 is a high-speed digital frequency divider that provides the second mixer LO signal on lead 49. Translator 68 buffers and level shifts the signal on lead 49 to establish logic levels on the TTL output lead 53 suitable for driving the timing circuits of block 24 of FIG. 1. The signal on lead 49 is also used to drive the second digital divider 54 that provides a signal on lead 56 that is one half the frequency of that on lead 49. During normal operation the phase and frequency on lead 56 will be equal to that of stable oscillator 55. Output 56 of digital divider 54 and output 57 of stable oscillator 55 are connected to phase-frequency detector 58. The element 58 comprises a combined digital phase-frequency detector (PFD) that may be similar to that of integrated circuit MC12540. The output of PFD 58 in combination with loop filter 59 and tuning element 60 provide a frequency and phase correcting control voltage to the aforesaid VCO 70 to lock its frequency and phase, as scaled by digital frequency dividers 50 and 54, to that of stable oscillator 55 thus causing the oscillator 41 to generate a frequency that is precisely 80 times that of stable oscillator 55. Those skilled in the art will recognize that the combination of the VCO 70, the first digital frequency divider 50, the second digital frequency divider 54, the phase-frequency detector 58, the loop filter 59 including the off chip capacitor 61, and the stable oscillator 55 form a phase lock loop 69 that is simple and for the most part uses elements that can be fabricated with silicon integrated circuit technology. One knowledgeable in the design of voltage controlled oscillators will appreciate the inclusion of voltage regulator 62 used to regulate and filter the voltage applied to VCO 70. Phase locked loop 69 is fixed frequency and is required to generate only a first LO frequency 42, a second LO frequency 49 and a frequency 56 equal to the stable oscillator frequency 57.

All other frequencies used by the digital correlator decimator are derived from output 53 of translator 68 by simple digital frequency division. Hence, the result is a simple low cost frequency synthesizer implementation suitable for inclusion in a highly integrated GPS receiver.

FIG. 3 is a diagram of a single satellite signal channel in the digital correlator decimator 24 which shows down converter output 23 going to one-bit analog to digital converter (A/D) 71 which quantize the signals on lead 23 to either a "one" or "zero" depending on the polarity of the input signals. Each correlator 24 includes two such circuits to provide the 2 channels. Quantization is done at the sample rate determined by the frequency of the signal on lead 53 originating from level translator 68. In the present implementation, this frequency is nominally 38.1915 MHZ. The quantize signals are output on lead 72 to the I/Q Select block 73. Block 73, 77, and 78 function together as a quadrature mixer which takes the sampled signals, lead 72 and generates in-phase "I" and quadrature "Q" signals while finally down converting the signals to a near zero frequency. Recalling that the signals on lead 23 are at approximately one fourth the sampling frequency on lead 53, operation of the circuit can be briefly explained by considering what is normally done to generate quadrature signals. Mathematically the signal is multiplied separately by the sine and cosine of the local oscillator signal. In a digital implementation, discrete sample times are used, the sample time can be thought of as occurring at the 90 degree points of the LO signals, that is at the peaks and zero crossings of the sine and cosine waves. The multiplications required are then simplified so that only one bit is required Further recalling that when the cosine wave is at its positive or negative peak, the sine wave is at zero and when the sine wave is at its positive or negative peak the cosine wave is at its zero, then the required multiplication sequence is +1, 0, −1,0 for the cosine wave and 0, +1, 0, −1 for the sine wave. The digital processing illustrated by blocks 73, 77, and 78 is one implementation of the procedure and is described in the following paragraph.

The function of block 73 is to take to incoming samples on lead 72 and alternately switch them between lead 74 and 75 in synchronism with the sample rate. This procedure results in the "I" samples leading the "Q" samples by a clock period. In addition to the selection of the "I" and "Q" signal samples, block 73 aligns the "I" and "Q" outputs in time by delaying the "I" signals such that they are coincident with the "Q" signals after which they are applied to inputs of exclusive OR "XOR" blocks 77 and 78 respectively. The output rate on leads 74 and 75 is nominally 19.09575 MHZ, half of the sample rate. The clock signals for the channel cell are derived from the level translated clock signal on lead 53. It is used directly to clock A/D converter 71 and is divided by two by digital divider 79 to obtain a nominal 19.09575 MHZ signal, lead 80, used to drive I/Q selector 73 and a second digital frequency divider 81. The output of block 81 is a timing signal that is one fourth the frequency of that on lead 53. Lead 76 is the output of block 81 and is applied to XOR gates 77 and 78 causing the signals on leads 74 and 75 to be alternately inverted then non-inverted at outputs 82 and 83 effectively multiplying the signals on 74 and 75 by either plus or minus one. Remembering the input signals on lead 23 are at a nominal frequency of 9.5685 MHZ and the nominal frequency on lead 76 is 9.547875 MHZ, one skilled in the art will realize that the signals are digitally converted to a near zero difference frequency that is nominally 20,625 HZ and further realize that the signals on lead 82 will be 90 degrees out of phase with those on lead 83. Block 73 could be constructed from readily available logic blocks such as "D" flip flops and an inverter.

The signals on leads 82 and 83 are coupled into complex phase detector 84. Complex phase detector 84 is a one-bit digital implementation of a single side band phase comparator. The complex signal inputs are on leads 82 and 83 while the complex reference frequency inputs are on leads 86 and 87, that is the one-bit cosine and sine outputs from numerically controlled oscillator (NCO) 113. The phase detector, block 84, output is the cosine of the difference between the frequencies of the complex inputs. An analog equivalent would have only a single output, however, the digital version which can only output "ones" and "zeros" needs a second output to indicate polarity. The magnitude is shown on lead 88 and the sign on lead 89. The second complex phase detector 85 performs the same function as 84 except that the connections 86 and 87 are arranged to produce the sine of the frequency difference with the magnitude on lead 94 and the sign on lead 117. In normal operation while tracking a satellite signal, the signal frequency on leads 82 and 83 and that of NCO 113 are the same so the average output from block 84 is a measure of the cosine of the phase angle difference between the down converted satellite signals and the NCO, block 113 also the average output of block 85 is a measure of the sine of this phase angle. One skilled in the art will recognize that this type of phase detector could be constructed from common logic blocks such as XOR gates and inverters.

The processing described up to this point has not yet demodulated the pseudo random noise (PN) code from the received signal. PN code modulation is the GPS system feature that allows separation of one satellite signal from the other. This is sometimes referred to as code division multiple access (TDMA). In addition, it provides a way of making pseudo range measurements. The demodulation process is the reverse of the modulation process used by the satellite. At the satellite, modulation is applied to the carrier by a process that can be described mathematically multiplying the carrier by either a plus or minus one depending on the state of the modulating PN code generator output. The demodulation process is accomplished in the GPS receiver by generating a code that is identical to that used by the satellite and providing a method for changing its position relative to the receiver clock via a control loop. In the present implementation, the codes are generated by block 102. A code matching the satellite to be tracked is selected via the code control buss 28 which is connected to PN code generator 102. PN code generator 102 is clocked via lead 101. Code clock generator 100 nominally divides by 3/112 in order to obtain a nominal 1.023 MHZ CA code clock. In order to correlate the code on the selected satellite signal, it is necessary for the phase of the code clock, lead 101 to be adjustable to allow time synchronization/alignment of the received code, whose time of arrival is variable, and the code generated by block 102. In the present implementation the code phase is adjusted by the control computer 27 via buss 28.

The PN code generator 102 in FIG. 3 has four outputs, leads 103, 104, 105, and 106, their purposes are discussed below. Lead 103 is referred to as the prompt (on time) code. Lead 104 is referred to as the "late" code, it is the same as prompt code 103 except it is delayed by one half of the code clock period on lead 101. An "early" code, internal to block 102, is the same as that of the prompt code except it occurs one half of a code clock cycle ahead of the prompt code. In other words, the early and late codes are one clock cock clock cycle ("one chip") apart and the prompt code is, ideally, half way between them. The early and late codes are differenced with the magnitude of the difference appearing on lead 105. The sign of the difference is on lead 104, the "late" code can be used to determine the sign. Magnitude 105 and sign 104 are applied to code discriminator 118. When tracking a satellite, prompt code 103 is in time alignment with the selected satellite signals appearing on lead 88, 89, 94, and 117. Prompt signal 103 is connected to the code inputs of prompt correlator, XOR gates 90 and 91. The polarity bits from phase detectors 84 and 85 are connected to the signal inputs of blocks 90 and 91 via leads 89 and 117. Those skilled in the art will recognize that XOR gates 90 and 91 provide a simple means for multiplying signals 89 and 117 by plus or minus 1 as determined by the prompt code on lead 103. When the prompt code and that modulated on the received signal are time aligned, code correlation occurs, thus demodulating the PN code from the carrier despreading the signal. The correlated outputs, leads 92 and 93 are used to determine the polarity (sign) of signal magnitudes on leads 88 and 94.

In order to maintain code alignment, a method for determining the degree of time miss-alignment is required. This is accomplished by using the previously described signals on leads 117, 94, 104, and 105 in conjunction with gates 108 and 109 of code discriminator 118. The output of logical "AND" gate 108 is the magnitude of the code position error and the output of XOR gate 109 is its polarity. The technique of subtracting the early and late codes prior to code discriminator correlation has been described by R. A. Yost and R. W. Boyd in the "IEEE Transactions on Communications", VOL. COM-30, No. 5, May 1982. One skilled in the art will recognize that using this approach eliminates the need for separate carrier phase detectors and the need for individual integrate and dump circuits for both the early and late codes in order to implement the code discriminator function.

The code epoch pulses that occur during the time when all of the code states are logical "ones" are available on lead 106. The PN codes used by the GPS satellites are defined in the Department of Defense Global Positioning System interface control documents such as "Navstar GPS Space Segment/Navigation User Interfaces, ICD-GPS- 200.

Although the signal frequency has been translated to zero and the signal despread by the phase detection and correlation process described in the paragraphs above, in order to distinguish the signal from the noise, additional filtering or integration is required. In the present implementation, this is accomplished for the prompt "I" and "Q" signals and the code discriminator, by integrate and dump circuits 95 and 96. The polarity bits on leads 92, 93 and 111 determine whether their respective integrators are incremented up or down whenever the magnitude is a "one". The integration process continues for a code period, nominally 1 millisecond, at which time the quantity in each integrator is read by the control computer 27. Then integrators 95, 96, and 112 are reset to zero by the code epoch pulses on lead 106. Since the signal inputs 88, 93, and 110 are still one-bit wide, the integrate and dump circuits could be implemented with up/down counters. The input rate to integrators 95, 96, and 112 is one half of the frequency Fs on lead 53 and the output rate is nominally 1 KHZ, a frequency low enough to be further processed by control computer 27.

Frequency generator 107 further divides the timing signals on lead 76 to provide a clocking signal for NCO 113 and a timing/interrupt signal, lead 114, for the control computer. In the present implementation, the signals on leads 115 and 114 are at nominal frequencies of 217 KHZ and 1 KHZ respectively.

Numerically controlled oscillator 113 provides an output frequency that is a function of a digital frequency word from control computer 27. In the present implementation, the frequency word is supplied by the control computer 27 via leads 26, 28. The operation of an NCO is described by J. Tierney, et al in the "IEEE Transactions On Audio and Electroacoustics"; Vol. ,AU-19, No.1; March 1971. In the present NCO implementation (block 113), one-bit approximations of the sine and cosine functions are used rather than the multi-bit digital to analog conversion described in the referenced paper. These one-bit outputs are available on leads 86 and 87. One skilled in the art will recognize that the use of one-bit outputs greatly simplifies the design of the NCO and the multiplication processes as explained in the discussion of phase detectors 84 and 85. Also use of a 24 bit NCO clocked at 217 KHZ provides a frequency resolution of 0.013 HZ. Implementing the basic NCO in the manner described herein can be easily accomplished using available integrated circuit technology. In addition to controlling the frequency of NCO 113, additional digital interfaces are provided to preset the NCO phase via buss 26, 28 and to read the phase to a fraction of a cycle. The blocks that interface with the control computer all contain address decoders, function select, and data latches as required for a given interface.

Figure 4:
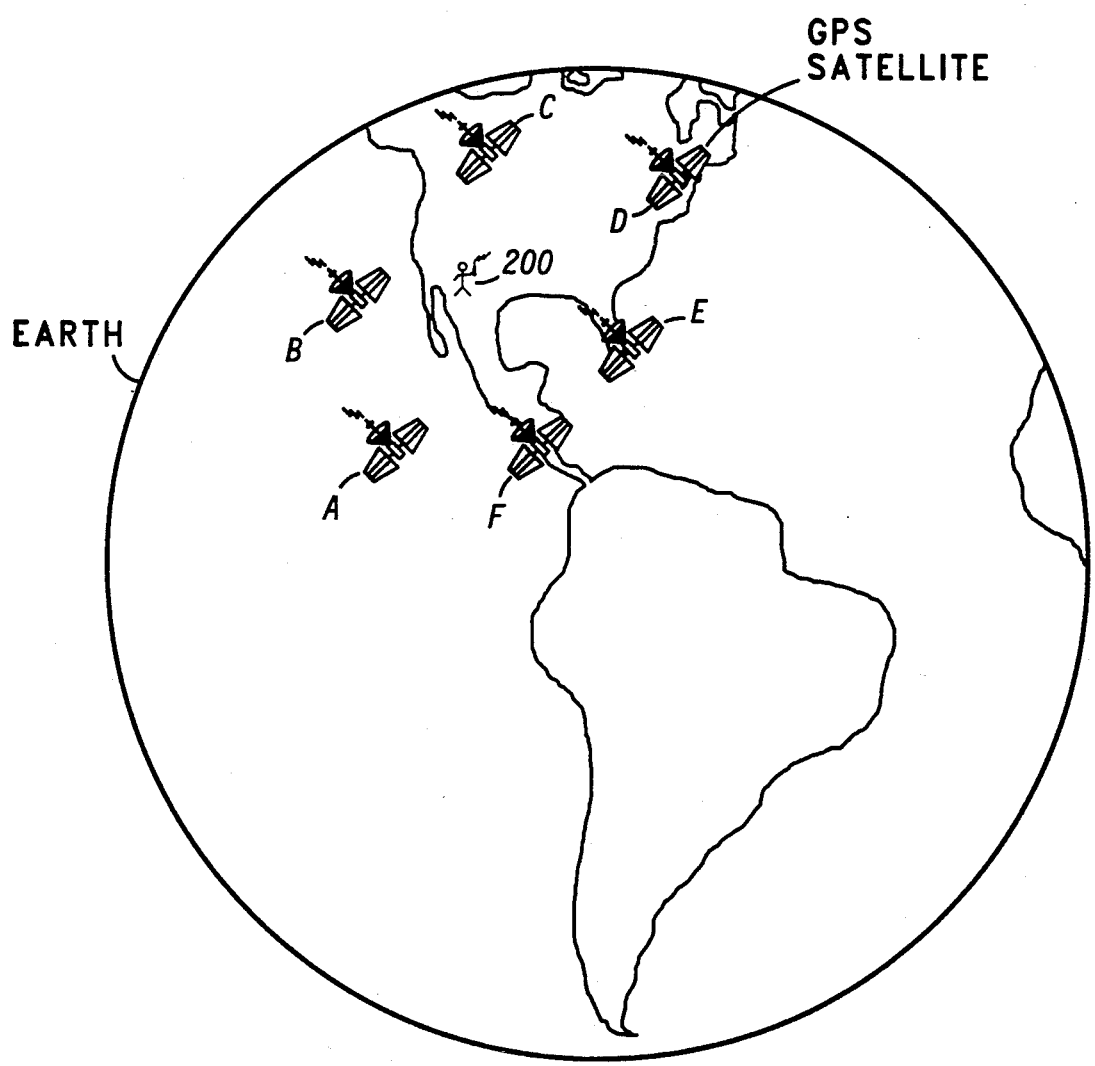
FIG. 4 is a diagram of a GPS satellite configuration above the earth.

Referring to FIG. 4, a diagram of a GPS satellite configuration about the Earth is shown. User 200 is holding a GPS receiver in accordance with the present invention. This GPS receiver tracks up to six GPS satellites A through F. These satellites must all be within line of sight of user 200. Each of the satellites transmits coded, spread spectrum satellite signals.

As can be seen from the above description, the present GPS digital receiver may be implemented with inexpensive parts and does not require high precision oscillators. Thus, this receiver is suitable for low-cost, high production GPS digital receivers.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A digital Global Positioning System (GPS) receiver for receiving a plurality of coded satellite signals from a plurality of satellites, said signals exhibiting Doppler shifting, said receiver comprising:

means for down converting said coded satellite signals to intermediate frequency signals;
said means for down converting including:
antenna means for receiving said coded satellite signals;
mixer means connected to said antenna means, said mixer means for converting said coded satellite signals of a particular frequency to said intermediate frequency signals;
phase lock loop means connected to said mixer means, said phase lock loop means for providing a phase correcting voltage signal representing the phase error between a scaled frequency of a voltage controlled oscillator stable and a reference oscillator signal; and
voltage controlled oscillator means operating at L-band and operating in response to the phase correcting voltage signal of said phase lock loop means to produce a first mixer signal, said voltage controlled oscillator means being connected to said phase lock loop means; and
said phase lock loop means for providing a second mixer signal;
A/D means coupled to said means for converting, said A/D means for simultaneously translating said intermediate frequency signals for said plurality of coded satellite signals to a plurality of digital signals;

correlation means coupled to said A/D means, said correlation means for simultaneously separating each of said plurality of digital signals corresponding to each said satellite to provide "I" and "Q" channel information signals;

processor means coupled to said correlation means, said processor means for retrieving information transmitted from each of said satellites in response to said "I" and "Q" channel information signals.

2. A digital GPS receiver as claimed in claim 1, wherein said correlation means includes a plurality of correlation means connected between said A/D means and said processor means, each of said plurality of said correlation means providing "I" and "Q" channel information signals for a predetermined number of satellite signals.

3. A digital GPS receiver as claimed in claim 2, wherein said processor means includes a plurality of processor means, each of said processor means connected to a corresponding one of said plurality of correlation means and each of said processor means connected in common; each of said plurality of processor means for retrieving said transmitted from a predetermined number of satellite signals of said plurality of said satellites.

4. A digital GPS receiver as claimed in claim 2, wherein said processor means is connected to each of said plurality of correlation means, said processor means for retrieving pseudo-range information and broadcast data from each of said plurality of satellite signals.

5. A digital GPS receiver as claimed in claim 4, wherein said processor means includes an integrated circuit, such as the MC68331 processor.

6. A digital GPS receiver as claimed in claim 1, wherein said mixer means includes:
L-band amplifier means connected to said antenna means;
first mixer means connected to said L-band amplifier means and to said VCO means;
first amplifier means for providing an adjustable gain;
first filter means connected between said first mixer means and said first amplifier means;
second mixer means connected to said first amplifier means and to said phase lock loop means; and
second amplifier means connected to said second mixer means, said second amplifier means providing said intermediate frequency signals.

7. A digital GPS receiver as claimed in claim 6, wherein said second amplifier means includes second filter means connected to said second amplifier means, said second filter means for providing said intermediate frequency signals.

8. A digital GPS receiver as claimed in claim 1, wherein said phase lock loop means includes:
first means for dividing the frequency of said first mixer signal to produce a prescaled signal, said first means for dividing being connected to said voltage controlled oscillator means;
second means for dividing connected to said first means for dividing, said second means for dividing said prescaled signal by one-half;
stable oscillator means providing a signal of a predetermined frequency; and
frequency detector means connected to said stable oscillator means and to said second means for dividing, said frequency detector means providing an output voltage signal proportional to the difference in frequencies of said predetermined signal of said stable oscillator means and divided prescaled signal of said second means for dividing.

9. A digital GPS receiver as claimed in claim 8, wherein said voltage controlled oscillator means includes:
tuning means connected to said frequency detector means, said tuning means operating in response to said output voltage signal to provide an adjustment signal; and
L-band oscillator means connected to said tuning means, said first means for dividing and said first mixer means, said L-band oscillator means operating in response to said adjustment signal to produce an L-band oscillator signal having a frequency that is precisely 80 times the frequency of said stable oscillator.

10. A digital GPS receiver as claimed in claim 8, wherein said stable oscillator means includes a lower accuracy oscillator of approximately 19.09575 megahertz in frequency.

11. A digital GPS receiver as claimed in claim 1, wherein said mixer means, said phase lock loop means, and said voltage controlled oscillator means comprise a single integrated circuit.

12. A digital GPS receiver as claimed in claim 1, wherein said A/D means includes a one-bit analog-to-digital converter means for converting and translating one bit from each of said plurality of coded satellite signals.

13. A digital GPS receiver as claimed in claim 12, wherein there is further included means for transmitting said plurality of digital signals to each of said plurality of correlation means, said means for transmitting being connected to said one-bit analog-to-digital conversion means and to each of said correlation means.

14. A digital GPS receiver as claimed in claim 13, wherein each of said plurality of correlation means includes:
first phase detection means coupled to said means for transmitting, said first phase detection means for producing first magnitude and sign signals from a corresponding one of said plurality of digital signals; and
second phase detection means coupled to said means for transmitting and to said first phase detection means, said second phase detection means for providing second magnitude and sign signals in response to said one of said plurality of said digital signals.

15. A digital GPS receiver as claimed in claim 14, wherein there is further included:
first exclusive-OR means connected between said means for transmitting and said first and second phase detection means; and
second exclusive-OR means connected between said means for transmitting and said first and second phase detection means.

16. A digital GPS receiver as claimed in claim 14, wherein each of said correlation means further includes:
first integration means coupled to said first phase detection means, said first integration means operating in response to said first magnitude and sign signals to produce said I channel information signal; and second integration means coupled to said second phase detection means, said second integration means operating in response to said second sign and magnitude signals to produce said Q channel information signal.

17. A digital GPS receiver as claimed in claim 16, wherein there is further included:
third exclusive-OR means connected between said first phase detection means and said first integration means, said third exclusive-OR means for processing said first sign signal; and
fourth exclusive-OR means connected between said second phase detection means and said second integration means, said fourth exclusive-OR means for processing upon said second sign signal.

18. A digital GPS receiver as claimed in claim 17, wherein there is further included:
a frequency source;
code clock generator means connected to said frequency source and to said processor means, said code clock generator for producing a digital PN code clock signal of approximately 1.023 megahertz, said code clock generator means for adding or deleting clock cycles from the PN code clock signal upon command of the processor means so as to advance or delay the PN code clock signal in time; and
PN code generator means connected to said code clock generator means, to said processor means and to said third and fourth exclusive-OR means, said PN code generator means for producing an on-time code transmitted to said third and fourth exclusive-OR means.

19. A digital GPS receiver as claimed in claim 18, wherein there is further included code discriminator means coupled to said first and second phase detection means and to said PN code generator means, said code discriminator means for providing third magnitude and sign signals for maintaining the alignment of said I and Q channel information signals.

20. A digital GPS receiver as claimed in claim 19 wherein there is further included third integration means coupled between said code discriminator means and said processor means, said third integration means for providing said alignment signal in response to said third magnitude and sign signals.

21. A digital GPS receiver as claimed in claim 20, wherein there is further included:
frequency generator means for producing a first frequency of approximately 1 kilohertz and a second frequency of approximately 217 kilohertz; and
numerically controlled oscillator means connected to said frequency generator means, to said processor means, to said third integration means, and to said first and second phase detection means, said numerically controlled oscillator means providing an output frequency that is a function of a digital frequency word of said processor means.

22. A digital GPS receiver for receiving a plurality of coded satellite signals from a plurality of satellites, said signals exhibiting Doppler shifting, said digital Global Positioning System (GPS) receiver comprising:
antenna means for receiving said coded satellite signals;
mixer means coupled to said antenna means, said mixer means for converting said coded satellite signals of a particular frequency to intermediate frequency signals;
said mixer means including:
analog-to-digital means;
phase lock loop means connected to said analog-to-digital means, said phase lock loop means for providing a phase correcting voltage signal representing the phase error between a scaled frequency of the coded satellite signals and a reference voltage oscillator signal, said phase lock loop means for providing a second mixer signal;
voltage controlled oscillator means connected to said phase lock loop means, said voltage controlled oscillator means operating at L-band and in response to the phase correcting voltage signal of said phase lock loop means to produce a first mixer signal; and
said analog-to-digital means coupled to said mixer means, said analog-to-digital means for simultaneously translating said intermediate frequency signals for each of said plurality of coded satellite signals to a plurality of digital signals;
said digital GPS receiver means further comprising:
correlation means coupled to said analog-to-digital means, said correlation means for simultaneously separating each of said plurality of digital signals corresponding to each of said satellites to provide "I" and "Q" channel information signals;
said correlation means including:
first phase detection means coupled to said analog-to-digital means, said first phase detection means for producing first magnitude and sign signals from a corresponding one of said plurality of digital signals;
second phase detection means coupled to said analog-to-digital means and to said first phase detection means, said second phase detection means for providing second magnitude and sign signals in response to said one of said plurality of said digital signals; and
processor means coupled to said correlation means, said processor means for retrieving pseudo-range and broadcast data information transmitted from each of the satellites in response to said "I" and "Q" channel information signals.

23. A digital GPS receiver as claimed in claim 22, said correlation means includes a plurality of correlation means connected between said analog-to-digital means and said processor means.

24. A digital GPS receiver as claimed in claim 23, wherein said processor means is connected to each of said plurality of correlation means, said processor means for retrieving pseudo-range information and broadcast data from each of said plurality of satellite signals.

25. A digital GPS receiver as claimed in claim 22, said antenna means includes:
an antenna for receiving spread spectrum signals;
prefilter means connected to said antenna, said prefilter means for rejecting out of L-band signals received by said antenna;
low-noise amplifier means connected to said prefilter means, said low-noise amplifier means providing a gain to said filtered L-band signals; and
bandpass filter means connected between said low-noise amplifier means and said mixer means, said bandpass filter means for rejecting out of L-band signals.

26. A digital GPS receiver as claimed in claim 22, wherein said phase lock loop means includes stable oscillator means providing a signal of a predetermined frequency.

27. A digital GPS receiver as claimed in claim 26, wherein said stable oscillator means includes a lower accuracy oscillator of approximately 19.09575 megahertz in frequency.

28. A digital GPS receiver as claimed in claim 26, wherein said stable oscillator means includes a precise oscillator of approximately 19.09575 megahertz in frequency.

29. A digital GPS receiver for receiving a plurality of coded, spread spectrum satellite signals from a plurality of satellites, said signals exhibiting Doppler shifting, said digital Global Positioning System (GPS) receiver comprising:
  antenna means for receiving said coded, spread spectrum satellite signals;
  mixer means connected to said antenna means, said mixer means for converting said coded, spread spectrum satellite signals of a particular frequency to intermediate frequency signals;
  a plurality of correlation means;
  said plurality of correlation means each including:
    analog-to-digital means;
    phase lock loop means connected to said analog-to-digital means, said phase lock loop means for providing a phase correcting voltage representing the phase error between a scaled L-band frequency and a reference voltage oscillator signal, said phase lock loop means for providing a second mixer signal;
    voltage controlled oscillator means connected to said phase lock loop means, said voltage controlled oscillator means operating at L-band and in response to the phase correcting voltage signal of said phase lock loop means to produce a first mixer signal; and
  said analog-to-digital means coupled to said mixer means, said analog-to-digital means for simultaneously translating said intermediate frequency signals for each of said plurality of coded, spread spectrum satellite signals to a plurality of digital signals;
  means for transmitting said plurality of digital signals to each of said plurality of correlation means, said means for transmitting being connected to said analog-to-digital conversion means and to each of correlation means;
  said digital GPS receiver means further comprising:
    said plurality of correlation means coupled to said analog-to-digital means, said plurality of correlation means for simultaneously separating each of said plurality of digital signals corresponding to each satellite to provide "I" and "Q" channel information signals; and
    processor means coupled to said plurality of correlation means, said processor means for retrieving information transmitted from each of the satellites in response to said "I" and "Q" channel information signals.

* * * * *